FLOATING BOOMS

Original Filed June 24, 1968 4 Sheets-Sheet 1

INVENTOR.
Millard F. Smith
BY

Mattern, Ware & Davis
ATTORNEYS.

FLOATING BOOMS

Original Filed June 24, 1968 4 Sheets-Sheet 2

INVENTOR.
Millard F. Smith
BY
Mattern, Ware & Davis
ATTORNEYS.

INVENTOR.
Millard F. Smith
BY
Mattern, Ware & Davis
ATTORNEYS.

FLOATING BOOMS

Original Filed June 24, 1968 4 Sheets-Sheet 4

INVENTOR.
Millard F. Smith
BY
Mattern, Ware & Davis
ATTORNEYS.

United States Patent Office

Re. 27,452
Reissued Aug. 1, 1972

27,452
FLOATING BOOMS

Millard F. Smith, Westport, Conn.
(P.O. Box 295, Saugatuck, Conn. 06880)

Original No. 3,499,290, dated Mar. 10, 1970, Ser. No. 739,452, June 24, 1968. Application for reissue Apr. 8, 1971, Ser. No. 132,345
Int. Cl. E02b *3/04, 15/04*
U.S. Cl. 61—1 F 15 Claims

Matter enclosed in heavy brackets [ ] appears in the original patent but forms no part of this reissue specification; matter printed in italics indicates the additions made by reissue.

ABSTRACT OF THE DISCLOSURE

A portable flexible floating boom for confining oil or other material floating on the water, or as a current or wave controlling or inhibiting breakwater, groin, jetty, or the like, or for protecting beaches from harmful marine creatures, the boom incorporating a series of elongated floats of foamed elastomer connected in longitudinally spaced end-to-end relation by a continuous underwater barrier in the form of a water-impervious flexible polymer fin depending from and supported by the floats substantially in the central longitudinal vertical plane of the floats, the barrier being extended at its ends beyond the two end floats of the boom and having end plates secured thereto for connection of towing or anchoring lines, the upper edge of the barrier between the floats and along its extended ends being substantially level with the upper sides of the floats, and each of the floats having a series of longitudinally spaced yoke-like metal straps embracing its upper side in imbedded non-projecting snag-proof relation, the sides of the straps converging beneath the floats with their ends clamped upon opposite sides of the barrier fin, whereby the barrier fin is supported by the straps in suspended relation beneath the floats. A reinforcing cable extends the length of the boom at one side of the barrier fin adjacent the undersides of the floats and is anchored at its ends to the end plates, supporting clips being swaged to grip the cable in correspondingly spaced relation to the longitudinal spacing of the barrier fin supporting straps along the boom, each clip being clamped between one side of the barrier and one end of each respective strap. It is also contemplated that an auxiliary barrier, which may be in the form of a water-pervious net or the like of suitable extent may be suspended from the cable to extend to any desired depth in the water below the water-impervious barrier fin.

BACKGROUND OF THE INVENTION

Oil spill control

Oil spills have created problems of increasing seriousness in many parts of the world during recent years. In several cases, large oil tankers wrecked at sea have spilled thousands of gallons of crude oil into the ocean near beaches, harbors and shore installations. Ruptured hoses and leaking fittings at refineries and shipping terminals have created serious oil spills in busy harbors, and many states and cities are adopting laws requiring that oil booms to contain spilled oil be available at all oil transfer installations. The oil boom of Millard F. Smith's United States Patent 3,146,598 has gone into wide use in many such installations and has provided satisfactory containment of oil under normal conditions. Severe tidal current or rough sea conditions have occasionally overstrained and broken such booms and various improvements and refinements in oil booms of this type have been found highly useful to produce heavy-duty booms for withstanding high towing tensions, rough sea conditions and substantial transverse tidal currents. In addition to the containment of spilled oil or other floating material, the high strength booms of the present invention are highly useful in other open sea installations where heavy-duty floating booms are required.

BEACH EROSION CONTROL

Surf striking a shoreline constantly pulverizes the material near the water's edge, and thereby manufactures fine grains of sand. This comes about as a result of several factors. Waves moving at high velocity against the shoreline force water into cracks in this material, compressing the air trapped into these cracks. This compressed air often forces bits of the material from the main body. The impact of water laden with rock or sand fragments, and the abrasion of these fragments in suspension, also serves to grind away the shoreline material, forming smaller particles which because of their relatively light weight under water, can be held in suspension by rapidly moving water for considerable periods of time.

In most shoreline regions, arriving breakers do not approach the shore directly, but generally approach it from an oblique angle. Generally speaking, at most shoreline locations most waves approach the shore from a particular angle or direction under the influence of the prevailing winds.

As each wave curls and breaks along the shore, it picks up and carries with it a substantial quantity of sand in suspension. Since it strikes the shoreline obliquely, the energy of the wave serves to move sand particles already present at the shoreline a small distance down the shore, in the direction in which the wave is traveling. Thus, on any given length of shoreline, an immense quantity of sand is perpetually moving parallel to the shore, forced along by the prevailing angle of impact of surf upon the shore. This massive transport has been likened to a conveyor belt, upon which thousands of tons of sand travel daily down a coastline, and it is called "littoral transport" or "littoral drift" of the sand. For a fuller description see chapters IX and X of Waves and Beaches, The Dynamics of the Ocean Surface, by Willard Bascom, pp. 184–235. (Anchor-Doubleday, New York, 1964 ed.).

Many areas of our eastern and western seacoasts, which are exposed to the open ocean, have been fighting a losing battle against beach erosion. The constant migration of sand down the coast has caused serious erosion problems in many of these areas.

Particularly along steep seaside cliffs, such as the cliffs behind Nauset Beach along the eastern shore of Cape Cod, the effects of erosion in destroying and carrying away large volumes of the shore can be observed with impressive magnitude. In many beach areas, sand is picked up from a river delta or other underwater supply region to enter the "littoral conveyor belt," where it is moved along the shore and ultimately deposited in some other large underwater "dumping ground." If no ample sand supply barrier is available, however, the littoral drift progressively erodes the shoreline, which is not built up by the redeposit of sand thereon. Thus, at Cape Cod's Nauset Beach, prevailing winds and surf generally arrive at an oblique angle to the north-south beach, and beginning at the northern tip of Cape Cod the waves successively move the particles of sand southward. Progressive erosion of the Cape has produced high bluffs which are believed by some observers to be an eloquent demonstration of such beach erosion. After the southward trip along the entire north-south coastline of Cape Cod, the sand is deposited in enormous shoal grounds north and south of Nantucket Island, forming Stone Horse Shoal, Monomoy Point, and other shoals and banks extending far out to sea.

There are two principal ways in which sand traveling on this "conveyor belt" can be made to accumulate at a particular shore area, preventing the erosion of beaches and sandbars by this general movement of sand down the coast. The first of these is to prevent, by some means, vigorous wave motion in the area just off the shore point for which protection is desired. Sand is more dense than sea water, and for this reason suspension of sand in the sea water is possible only if the sea water is in a rapid motion. If agitation of the water can be substantially reduced, the sand will no longer drift in suspension but will settle to the bottom, allowing an accumulation to form just off the beach which is desired to be protected. A breakwater parallel to the beach generally produces shoaling by this wave-damping means, depositing suspended sand between itself and the beach front.

The second means of preventing erosion of a shoreline or beach is to erect a barrier perpendicular to the shoreline extending out into the sea for a distance of several hundred feet. If this barrier is impervious to sand suspended in water, it will often interrupt the continuous "conveyor system" which is transporting sand parallel to the coastline, and allow the accumulation of sand on the side of the barrier facing toward this sand current or "littoral drift."

Property owners have tried various means to save their land. One of the most frequently used means is the construction of stone or wooden jetties or "groins," extending several hundred feet into the sea, roughly at right angles to the shoreline. These groins are normally expensive to build, and their construction requires knowledge of jetty-building techniques. The building of these jetties also involves the transport of large quantities of heavy material into water so deep as to cause serious inconvenience. This is a special hardship to the individual homeowner, who may, because of limited means, find it impossible to employ large numbers of persons using expensive machinery.

The phenomenon of shore erosion is a very complex one, and even the best technology has so far been unable to forecast infallibly the effects of construction of these jetties in a given area. Especially in areas such as New Jersey, the improper placement of these jetties or groins, far from inhibiting beach erosion, may actually *accelerate* it, much to the dismay of communities and homeowners. Therefore the non-portability of such permanent jetties is a factor seriously limiting their usefulness, since it is extremely expensive to dismantle and reconstruct them in a different place. This makes the need for portable and inexpensive jetties or groins doubly apparent.

PROTECTION OF BEACHES FROM SHARKS AND JELLYFISH

The enjoyment of many a seashore weekend or vacation has been marred by the presence in swimming areas of undesirable marine creatures. Anyone who swims frequently is aware that, during certain seasons of the year, literally millions of jellyfish and Portuguese Men-of-War come floating into beach and swimming areas from the open ocean. These jellyfish have no ability to provide their own motion, but simply drift with currents and tides. Beneath the main jelly-like mass of the fish, which floats on the surface, the jellyfish trails many tentacles several feet long, used by the jellyfish to capture its food. Along the entire length of each tentacle are distributed millions of tiny sacs, each containing a poisonous substance. When this poison is applied to smaller creatures, the dose is large enough to paralyze and even kill the prey. When a man swimming in seawater comes in contact with one of these jellyfish tentacles, he experiences a sharp stinging sensation like a whiplash on his body. This is extremely painful, raising large red welts on the skin which frequently last for days, producing great discomfort and inconvenience. In some cases, more serious injury results. Indeed, persons with weak hearts have been known to be killed as a result of being stung by a jellyfish. Many others experience temporary paralysis to a greater or lesser degree.

A more serious problem at beach areas is the intrusion of highly dangerous sharks. These animals are carnivorous, and frequently attack swimmers. They are magnificently equipped for killing their prey, having wide mouths, extremely strong jaws, and up to four rows of large sharp teeth. Each year, deaths are reported as a result of shark attacks on swimmers, and many maimings result from these attacks. Sharks generally inhabit warm waters, and for this reason the shark problem is more pressing on our southern beaches. However, since the average temperatures of the sea are in general rising, more and more incidents of sharks and shark attacks have been reported at our northern beaches in the United States and this trend shows no sign of abating.

Another problem, less drastic but equally annoying in nature, is the presence of floating trash in waters adjacent to beaches. The rising extent of this problem need hardly be pointed out, since everyone is aware of State and Federal efforts to halt "littering." However, it is unlikely that total cessation of the dumping of refuse into the sea will ever be accomplished. At most beaches, refuse is washed up along the entire length by waves and wind, destroying the beauty of entire recreational areas. Thus an economical method for directing this floating waste to central points for collection and removal is urgently needed.

There have, in the past, been expensive attempts to erect shark-excluding structures around swimming areas adjacent to beaches. These attempts generally involve costly steel nets, often supported by immovable pilings driven into the sea bottom, or by other forms of permanent platforms or stands. These devices have proven reasonably effective in excluding sharks from swimming areas, but have not been perfect. In isolated cases, sharks have penetrated this barrier by passing under the bottom of the net.

This type of device is of little help in excluding jellyfish from swimming areas, since a much finer net is required to stop penetration by jellyfish than by sharks.

On beaches without such protective devices, securing the safety of swimmers has been a considerable task indeed. Great expense is required to provide swimming areas with sufficient numbers of lifeguards so that adequate warnings may be given swimmers if sharks appear. Of course, when sharks or jellyfish do appear, there is no recourse but to close the beach to swimming and halt the recreational activity of the people thereon.

Even in areas equipped with the known shark-excluding devices, which allow swimming even when sharks are about, there has, up to now, been no practical way to permit swimming when jellyfish are in the area.

GENERAL AND SPECIFIC OBJECTS OF THE INVENTION

The present invention relates to a portable flexible floating boom, particularly of the type disclosed in the United States patent to Millard F. Smith No. 3,146,598, dated Sept. 1, 1964 and in the United States patent to Millard F. Smith and Anthony V. Anusauckas, No. 3,321,923, dated May 30, 1967, and has for an object of the invention to provide improvements over the boom structures disclosed in these patents.

It is particularly proposed to provide improved means for assembling and connecting the barrier fin and floats forming parts of the boom structure, such means particularly comprising improved yoke-like metal barrier supporting strap members adapted to embrace the cylindrical foam plastic floats with depending ends of the strap clamped at opposed sides of the barrier fin, the engagement of the straps about the floats being such that the straps slightly imbed in the upper surface of the floats, to thus present a smooth snag-proof surface.

A further object is to provide a heavy-duty floating boom incorporating a reinforcing cable extending lengthwise of the boom and anchored at its ends, and having improved means for connecting the cable to the barrier supporting straps.

Another object of the invention is to provide such heavy-duty floating booms capable of withstanding normal weather and wave conditions near a beach exposed to the open sea, where they are deployed to minimize beach erosion or to enclose and protect swimming areas adjacent to the beach against invasion by dangerous marine creatures.

Another object is to provide improved snag-proof weight means for attachment to the lower margin of the barrier fin.

DETAILED DESCRIPTION OF THE PREFERRED EMBODIMENT

Figure 1:
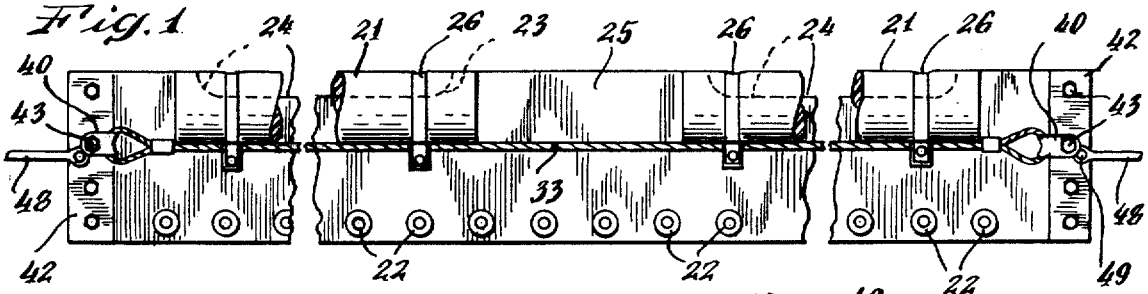
FIGURE 1 is a side elevation with parts broken away of a boom according to the preferred embodiment of the invention.
Figure 2:
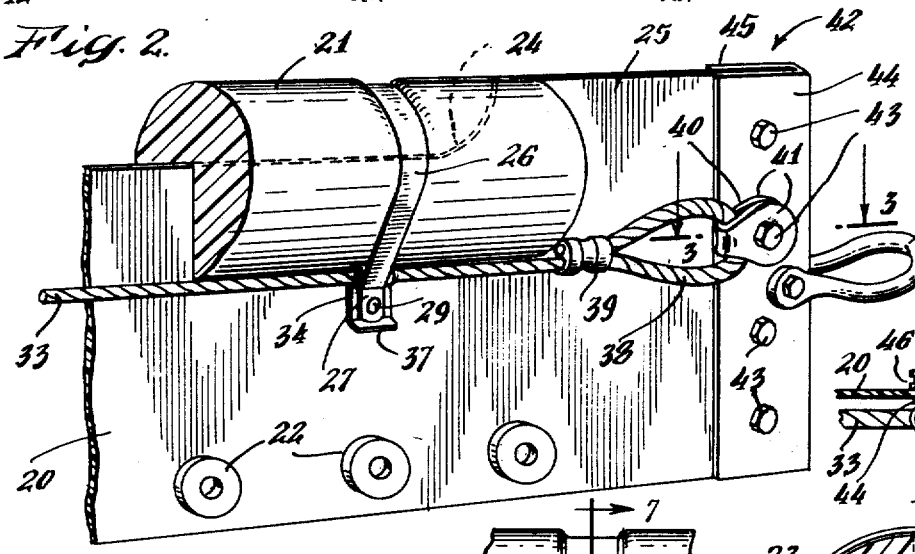
FIGURE 2 is a perspective view on an enlarged scale partially in vertical section showing one end portion of the boom.
Figure 3:
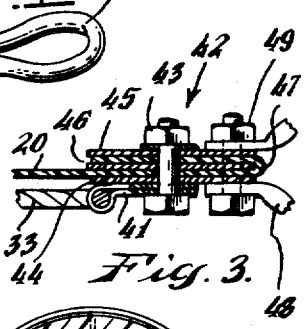
FIGURE 3 is a sectional view taken along the line 3—3 of FIGURE 2.
Figure 4:
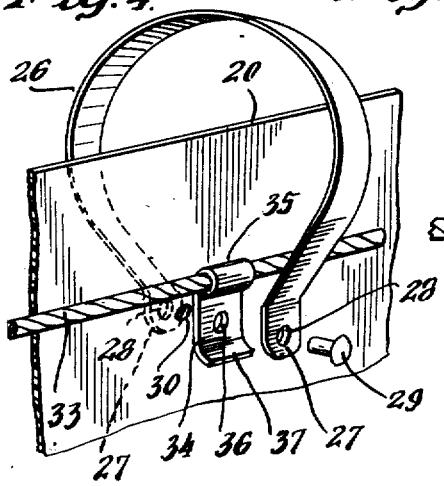
FIGURE 4 is a perspective view showing one of the strap members in separated relation, and also showing a portion of the cable and the attaching clip therefor in relation to be connected to the strap.
Figure 6:
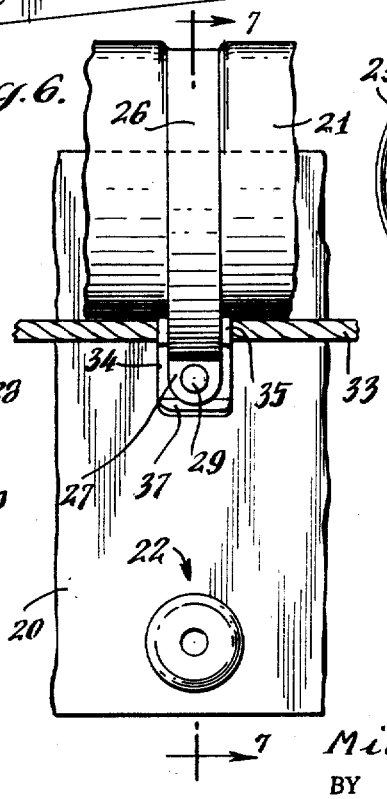
FIGURE 6 is a side elevation on an enlarged scale of a typical section of the boom.

Referring to the drawings and more particularly to FIGURES 1 through 7, the floating boom according to the exemplary embodiment of the invention illustrated therein generally comprises a continuous elongated flexible plastic curtain or fin 20, preferably in the form of an elongated strip of water-impervious polymeric sheet material, for example polyethylene, which is suspended in the water by a series of floats 21 of foamed or expanded rubber or polymeric material, for example foamed polyurethane, polyvinyl chloride or polyethylene, secured in longitudinally spaced relation along the upper marginal edge of the fin. Preferably the lower marginal edge of the fin is weighted by means of a series of longitudinally spaced ballast weight 22. The floats 21 are of cylindrical form and each float is provided with a longitudinal slot 23 in which the upper marginal edge portion of the fin is received, this slot being in the longitudinal vertical diametrical plane of the float and extending the full length of its lower side. The end portions of the slot extend entirely through the float to its upper side while its intermediate portion extends only partially through the float. The fin is provided at intervals along its upper marginal edge portion with cutouts 24 corresponding in shape to the upper edges of the slots 23 of the floats, so that when the fin is engaged in the slots of the series of floats, the upper edge of the upper marginal connecting segments 25 of the fin between the longitudinally spaced ends of the floats is level with the upper sides of the floats. These connecting segments between the floats are preferably somewhat longer than twice the diameter of the floats and thus permit accordion-folding of the boom structure, as shown in the Millard F. Smith United States Patent 3,146,598.

In a typical example, the floats 21 may be of the order of about nine feet long by about four inches in diameter, the spacing between the floats is about one foot, the overall height of the boom is about ten or more inches and the lower portion of the fin extending below the floats is about six or more inches. Thus, single boom sections can be of any desired length measured in ten feet increments, 100, 500, 1,000, 5,000 feet, etc., each increment representing the sum of the nine foot length of one float plus the one foot spacing between successive floats. Where greater boom lengths are desired than can be provided by a single boom section two or more boom sections may be joined in end-to-end relation, as will hereinafter more fully appear.

The barrier fin is secured in suspended relation to the floats by a series of longitudinally spaced strap members 26 provided along each float. Such strap members are preferably formed of stainless steel strip material. In a typical example such stainless steel strip material may be of the order of about .750 of an inch wide by .015 of an inch thick, and each float may be provided with between ten and fifteen strip members. As clearly shown in FIGURES 4, 5 and 7, the strap member is of generally yoke-shape with its side legs converging downwardly and having downwardly bent opposed terminal end clamp portions 27—27 provided with rivet receiving holes 28. In its engaged relation with the float the strap member embraces its upper and side surfaces with the side legs converging beneath the float and disposing the terminal clamp portions 27 at opposite sides of the fin where they are secured in clamped relation by a stainless steel headed rivet 29 engaged through the holes 28 and through a registering hole 30 in the fin. If desired, fin 20 may extend above floats 21, and straps 26 may have fin-clamping portions 27 both above floats 21 and below floats 21. In fastening the rivet 29, its rivet head engages the end 27 of the strap 26 at one side and the projecting rivet shank is engaged through a washer (not shown) or an attaching clip 34 at the other side, the projecting end of the rivet shank being headed over against the opposite end 27 of the strap 26 beyond the fin and washer or clip. By virtue of the soft slightly compressible nature of the foamed polymer material of the float, the thin metal strap is stretched taut in its assembled embracing relation about the float and becomes slightly imbedded in the upper and ide surfaces of the float, as clearly shown in FIGURE 6, hus presenting a smooth snag-proof surface free of any harp or protruding edges.

A stainless steel reinforcing cable 33, of about ¼ inch liameter in a typical example, extends the full length of he boom. In conjunction with some or all of the straps 26, the cable is provided with a series of stainless steel ubstantially rectangular attaching clips 34 having their pper end portions 35 curled and swaged about the cable; ach clip being secured in relation to each respective trap member. For this purpose the clip is provided with rivet receiving hole 36 whereby, simultaneously with he assembly of the fin and floats, each clip may be interosed and clamped by the rivet between one end portion 27 of each strap member and one side of the fin, with the urled swaged end 35 disposed in the space defined by ne side leg of the strap member at one side of the fin djacent the underside of the float. The lower marginal ortion of the clip is bent outwardly to provide an outvardly and downwardly inclined flange 37 disposed beeath the end portion 27 of the strap member in the asembled relation of the boom structure. The flange 37 is rovided with rounded ends and edges to avoid marring or lamage to the adjacent polymer boom components.

At each end the cable 33 is provided with an anchoring ye loop 38 formed by bending the cable back upon itelf, with the bent back end secured to the cable by a waged bronze or stainless steel sleeve 39. The loop 38 is ngaged through a stainless steel tang 40 provided with uperimposed apertured ears 41 secured either to a corresponding tang 40a of the next adjoining boom (FIGURE 8), or to an end plate assembly 42 to which tang 10 is joined (FIGURES 2 and 3) mounted upon the exended end of the fin 20, by one of the stainless steel olts 43 securing the end plate assembly in clamped relaion to the end of the fin. The end plate assembly 42 omprises a pair of outer stainless steel rectangular plates 44 and 45 and an intermediate stainless steel plate 46 bout which the end portion of the fin is folded as at 47, he outer plates being disposed at the outer sides of the olded end of the fin. Through tightening of the bolts 43 he folded end of the fin 20 and the intermediate end of he plate 46 are securely clamped between plates 45 and 46. A bronze or stainless steel shackle 48 for attachment f a tow line or anchor line is pivotally connected to the nd plate assembly by a shackle bolt 49 extending therehrough.

Figure 7:
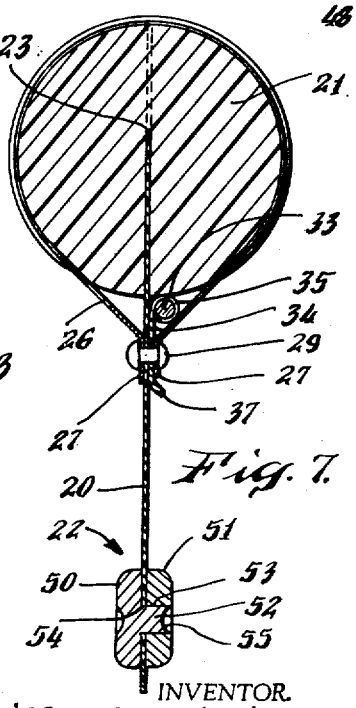
FIGURE 7 is a vertical sectional view taken along the line 7—7 of FIGURE 6.
Figure 5:
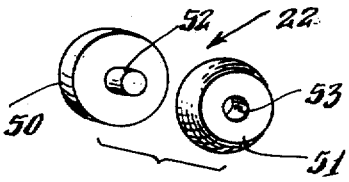
FIGURE 5 is a perspective view showing one of the weight members employed with its parts in separated relation.

The ballast weights 22 (FIGURE 2), which are preferably formed of four percent antimony hardened lead, ach comprise a pair of disc-like members 50 and 51 (FIGURE 5) rounded at their outer surfaces, the member 50 having a shank portion 52 adapted to be engaged nd swaged in a center hole 53 in the member 51, wherey upon engaging the shank 52 through a hole 54 in the in, as shown in FIGURE 7, the two parts 50 and 51 of ach weight 22 may be secured on opposite sides of the fin y swaging the end of the shank 52 within the hole 53, as t 55 (FIGURE 7). This weight structure provides balnce at the lower marginal edge of the fin, and because of ts smooth rounded external surface it presents a minimum of resistance to the flow of water relative to the surface of the fin, and is substantially snag-proof.

Figure 8:
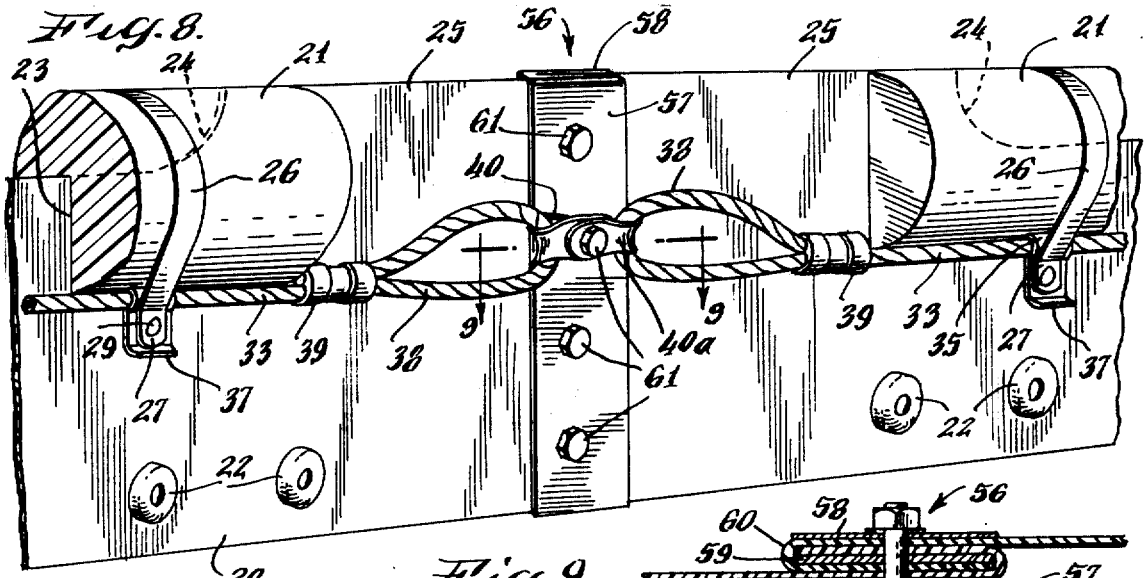
FIGURE 8 is a perspective view similar to FIGURE 2 and showing joint means connecting the ends of two boom sections.
Figure 9:
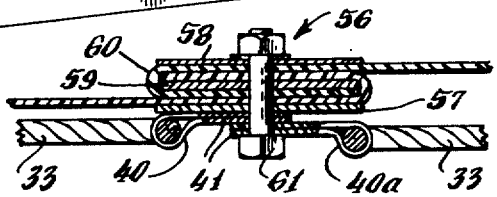
FIGURE 9 is a sectional view taken along the line 9—9 of FIGURE 8.

FIGURES 8 and 9 show a connecting end plate structure 56 for securing together the ends of two boom sections. This structure is substantially similar to the end plate structure shown in FIGURES 2 and 3. Like the end plate structure 42, the connection plate structure 56 comprises a pair of outer plates 57 and 58, an intermediate plate 59 about which the ends of the two fins of the two boom sections are folded as at 60 in interlocked or hooked relation, and row of clamping bolts 61 engaged through registered holes in the plates and folded fin ends, as clearly shown in FIGURE 9. The two cable loop attaching angs 40 and 40a are secured together by the clamping bolt 61 disposed substantially in line with the two cables 33.

Figure 10:
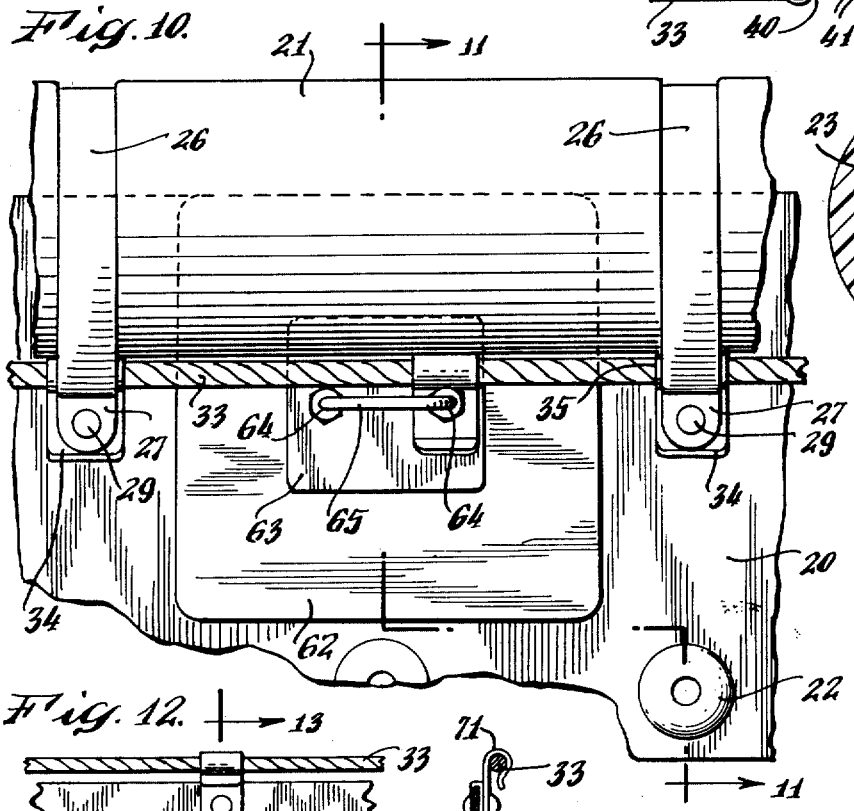
FIGURE 10 is a side elevation of an intermediate section of the boom and showing the incorporation therein of shackle means for connecting a tow line or anchor at a point of the boom intermediate its ends.
Figure 11:
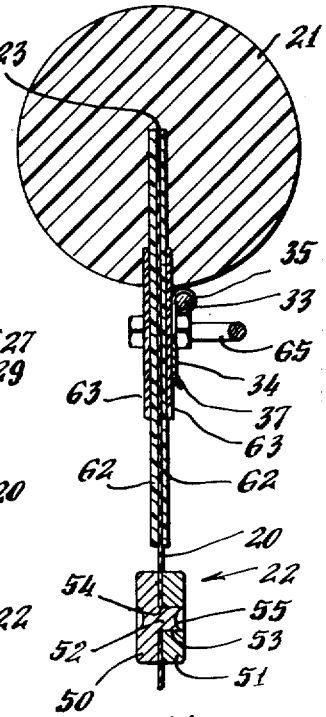
FIGURE 11 is a vertical sectional view taken along the line 11—11 of FIGURE 10.

In FIGURES 10 and 11, there is shown a U-bolt attachment for connecting tow lines and anchor lines at a point of the boom intermediate its ends. This consists of a pair of rectangular plates 62—62 adapted to be engaged at opposite sides of the fin 20 with their upper portions received in the slot 23 of the float 21 in the space between two adjacent strap members, and preferably substantially centrally of the float. The plates 62 are apertured and are preferably formed of a stiff, nonmetallic material, for example a heavy polymer panel such as a heavy polyethylene, and a pair of stainless steel bearing plates 63—63 are disposed at their outer sides, the several plates being adapted to be clamped together with the fin 20 between them through suitable aligned clamping apertures 64 by a stainless steel U-bolt 65 whose side legs may be bolted through the plates, as shown in FIGURE 11. A cable fastening clip 34 may be engaged by one leg of the U-bolt in clamped relation against one of the bearing plates 63. The arrangement is such that tow lines or anchor lines may be secured to a U-bolt 65 at an intermediate point along any one of the floats 21 and due to the relative flexibility of the floats 21 and fin 20, the boom may bend relatively to the plates 62 against loads exerted by a tow line or anchor line by way of U-bolt 65.

Figure 12:
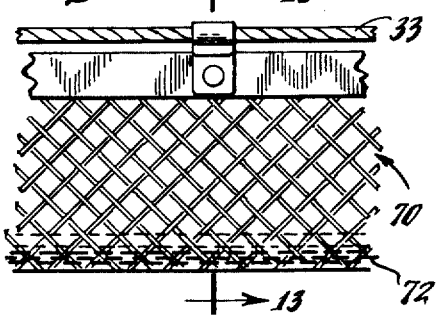
FIGURE 12 is a fragmentary side elevation showing an auxiliary barrier member for attachment to the cable of the boom.
Figure 13:
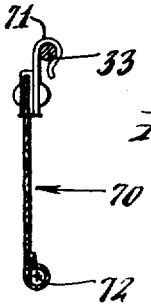
FIGURE 13 is a vertical sectional view taken along the line 13—13 of FIGURE 12.

In FIGURES 12 and 13 there is illustrated an auxiliary barrier member 70 in the form of a net of any desired material or mesh opening provided along its upper edge with a series of stainless steel hooks 71 riveted thereto, and which hooks may be engaged upon the cable 33 of the boom, whereby the auxiliary barrier may be supported by the boom structure. The auxiliary barrier 70 may be of any desired width to extend, for instance, to the sea bottom, and is provided along its lower edge with a suitable ballast weight means 72, which may, for example, be in the form of a chain hemmed into the lower edge of barrier 70. As will hereinafter be further pointed out, the auxiliary barrier may be employed in any desired boom installation to protect swimming areas against the intrusion of the sea creatures, such as sharks and the like.

BEACH EROSION CONTROL BOOMS

Figure 14:
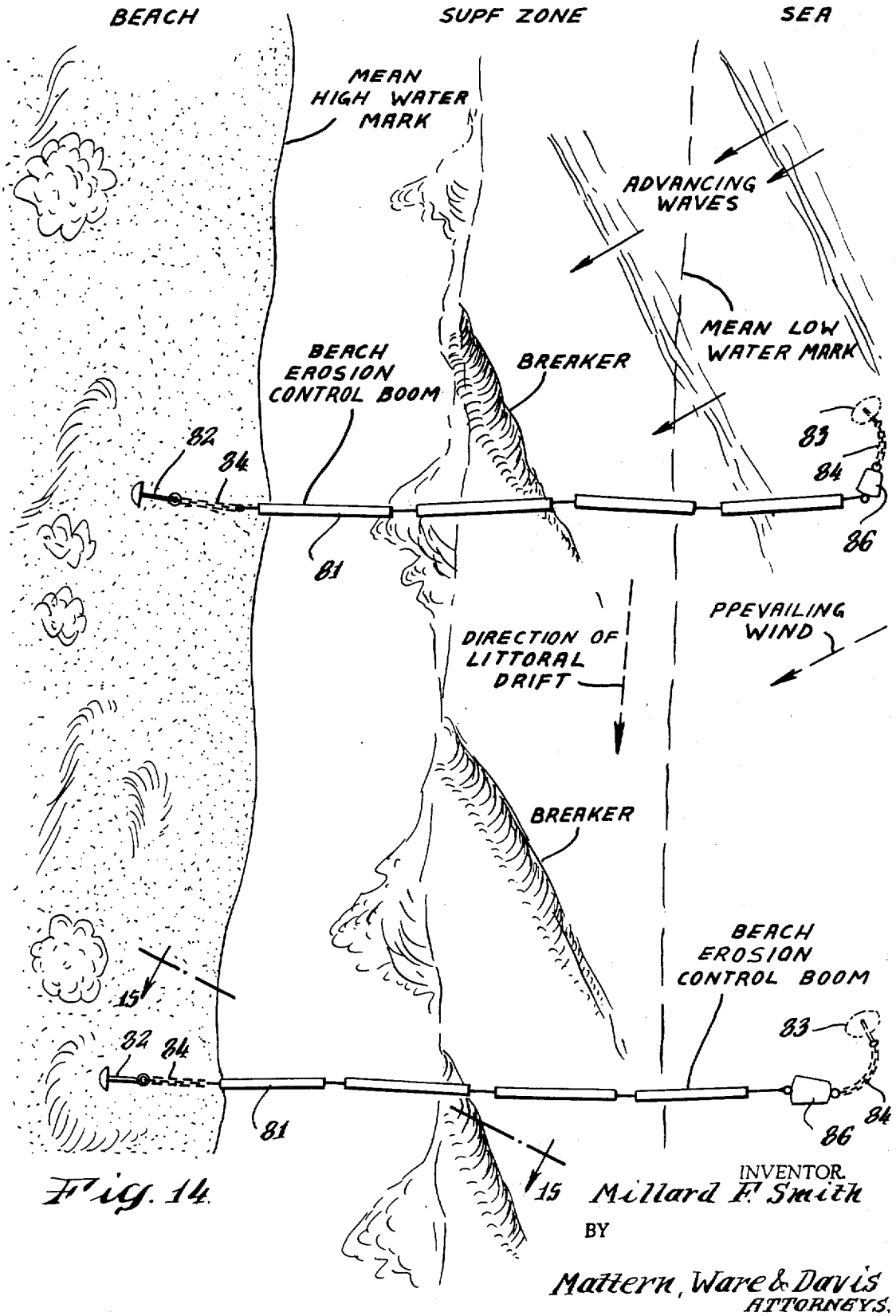
FIGURE 14 is a schematic plan view of a beach erosion control installation incorporating the booms of the present invention extending seaward from a beach through the breaker zone and held in place by anchors at each end.

As shown at high tide in FIGURE 14, a plurality of the heavy-duty booms 81 of the present invention may be anchored in the breakers or "surf zone" before a beach, extending seaward from a beach anchor at point 82 with their seaward ends being held in deployed position by suitable ground tackle, such as offshore anchors 83 connected by chain and anchor cable 84 to a float 86 which is shackled to the seaward end of each boom 81.

Figure 15:
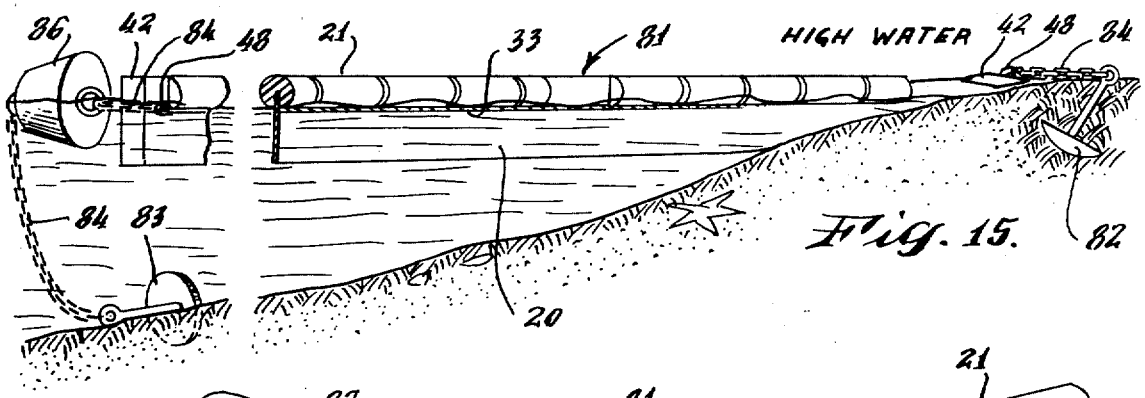
FIGURES 15 through 19 are successive diagonal oblique cross-sectional elevation views of the beach erosion control installation illustrated in FIGURE 14, taken along the section 15—15 shown in FIGURE 14, and illustrating the successive positions and operation of the erosion control booms of this invention with the ebb and flow of the tide.

The mechanism by which these erosion control booms 81 operate is illustrated schematically in FIGURES 15 through 19. In FIGURES 15, the landward end of the boom 81 is shown with a portion of the boom extending to seaward at the left-hand side of the figure toward the seaward float 86 and anchor at point 83, which is normally set at a position deploying the boom with about fifteen percent slack, so that it will sag downstream in the alongshore current and will provide sufficient slack for wave undulations and for breaking surf near the beach without stretching the boom taut.

Figure 16:
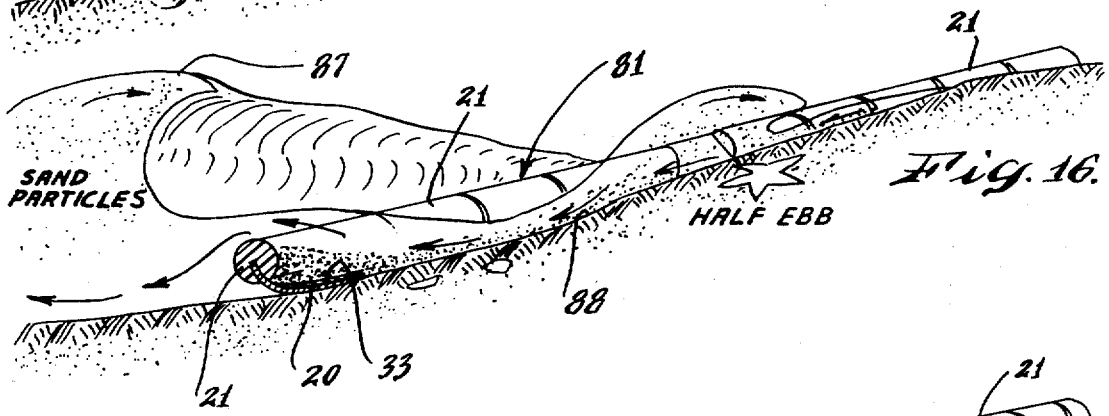
Figure 17:
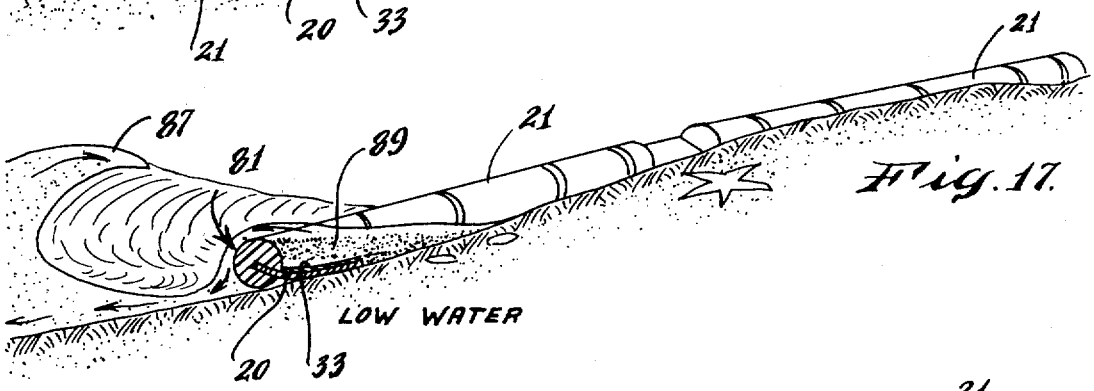

FIGURE 16 shows the effect of breaking waves on the boom at half tide, when the high tide has ebbed half way from the high water line to the low water line on the beach. At this position, the landward end of the boom 81 is laid out up the sloping beach, with its bouyant floats 21 being lifted upward by each advancing wave 87 and dropped back onto the sloping beach as the wave recedes. Suspended sand particles are generally carried in all seawater near shore and large quantities are often carried in the surf, as shown in FIGURE 16. Many such particles are normally carried back seaward down the sloping beach by every receding wave or "undertow" current 88. The effect of the boom in obstructing the seaward advance of these suspended sand particles is best illustrated in FIGURE 17, which shows the low tide position of the boom, now lying on the surface of the beach beyond the reach of some of the breaking surf. Suspended particles of sand 89 have now accumulated on the beach side of the expanded polymer float portion 21 of the boom 81, where they have been deposited by the receding water.

Figure 18:
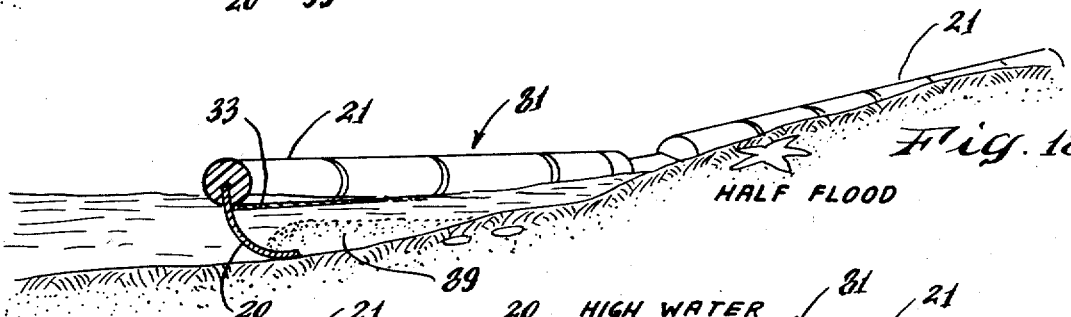

In FIGURE 18, the returning flood tide has again floated the boom 81, and the rising cylindrical floats 21 have drawn the depending fin 20 partially out from under the deposited sand 89.

Figure 19:
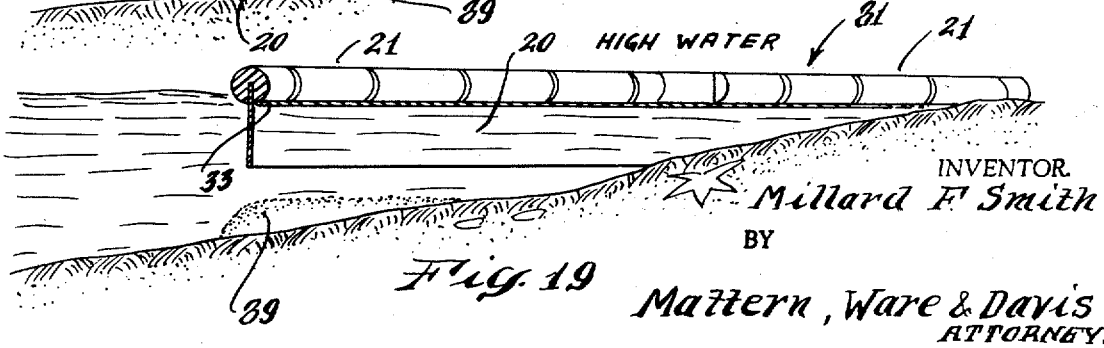

In FIGURE 19, at the following high tide, the boom 81 is again floating in its original position and the sand deposited during the intervening low tide water level is shown as a ridge of sand 89 on the bottom, beneath the breaking waves. Thus, each diurnal rise and fall of the tide collects an additional volume of suspended sand as the water recedes and leaves this volume of sand behind in a ridge along the bottom with the returning flood. As a result, a sand bar or narrow shoal 89 is built up on the bottom beneath the normal anchored position of the boom 81, and this shoal or sand bar has the same effect as a groin or jetty protruding from the beach in impeding and collecting sand, which would otherwise be carried alongshore by the littoral drift.

The booms of this invention are less expensive and far more convenient than wood or stone jetties, for they are each deployed with the same convenience as a small boat mooring, and they may be repositioned at will to take advantage of seasonal changes in prevailing winds, or to be accordion-folded and stored in protected quarters on shore if severe storms are expected.

Normal weather and sea conditions are easily withstood by the heavy-duty booms of the present invention incorporating their stainless steel cables 33 to carry tension loads securely anchored on the boom by the cooperating structural components described above.

NET CARRYING BOOMS

These same heavy-duty booms are also well adapted for enclosing and protecting swimming areas near beaches from sharks when the depending nets 70 of FIGURE 13 are employed, having sufficient length to reach the bottom at high water and being provided with suitable ballast weights to hold the lower net edge in contact with the bottom, retarding and discouraging marauding sharks. The normal cruising depth for the Portuguese Man-of-War is just beneath the surface of the water, and the depending polymer fins of the booms of this invention similarly impede the approach of the Portuguese Man-of-War toward such protected swimming areas. Thus, if a third boom is connected between the off-shore floats 86 in FIGURE 4, and all three booms 81 are provided with barrier nets 70, a substantial swimming region of the surf zone is "fenced" against the intrusion of these dangerous visitors.

While the objects of the invention are efficiently achieved by the preferred forms of the invention described in the foregoing specification, the invention also includes changes and variations falling within and between the definitions of the following claims.

I claim:

1. A floating boom comprising:

(A) a continuous elongated flexible polymer fin having upper and lower marginal edges, (B) a series of foamed polymer floats secured in longitudinally spaced end-to-end relation along the upper marginal edge of said fin with flexible sections of said fin extending between the adjacent ends of said floats with their upper edges substantially level with the upper sides of said floats and with end portions of said fins extending beyond the two end floats of said series of floats, (C) boom end means secured to the ends of said fin for connecting tow or anchor lines thereto, (D) a continuous non-slack, tension-carrying reinforcing cable extending along one side of said fin adjacent the undersides of said series of floats, and (E) means for anchoring the ends of said cable to said boom end means.

2. The floating boom defined in claim 1 [wherein the anchoring means includes] *incorporating means securing said floats to said fin which include* a plurality of thin metallic straps passing over the upper surface of each foamed polymer float and having their ends secured together by clamping means passing through the polymer fin beneath the float.

3. The floating boom defined in claim 2 wherein the clamping means comprises a stainless steel rivet, and in which the reinforcing cable and the metallic straps are all formed of stainless steel.

4. The floating boom defined in claim 2 wherein the reinforcing cable is firmly secured to each metallic strap by a metallic clip swaged about the cable and clamped by the clamping means to form with the metallic strap a unitary clamping assembly.

5. The floating boom defined in claim 1 further including U-bolt means having a bight portion laterally extending convexly from the boom beneath the level of the floats, and having legs terminating each end of the bight portion extending through apertures in the fin and clamped therein.

6. The floating boom defined in claim 1 further including a barrier net depending from said reinforcing cable to the sea bottom beneath said boom and provided with ballast weights along its lower edge.

7. The floating boom defined in claim 1 further including a plurality of ballast weights mounted along the lower edge of the fin, each ballast weight incorporating a pair of metal discs each having a flat inner side adjacent to the face of the polymer fin and a convexly rounded outer side, with the discs being joined together by securing means extending through the fin.

8. The floating boom defined in claim 7 wherein the discs of each ballast weight are joined together by a shank portion extending from the flat face of one disc through an aperture in the fin into telescoping engaged relationship inside a hole formed in the other disc.

9. The floating boom defined in claim 8 wherein the shank portion is spread laterally rivet fashion to swage and secure it within the hole to join the pair of discs together forming a unitary ballast weight sturdily anchored through the lower edge of the polymer fin.

10. Apparatus for retarding and counteracting littoral drift of sand alongshore caused by coastwise currents in the surf zone adjacent to a beach exposed to the open sea, comprising in combination:

(A) a plurality of anchors embedded at spaced-apart intervals along the beach, (B) a corresponding plurality of floats securely anchored offshore beyond mean low water mark, and (C) a floating boom of the kind defined in claim 1 connected between each beach-embedded anchor and a corresponding offshore float, said boom being of sufficient length to provide slack permitting downstream sag and articulated flexing of the fin of said boom between its floats under the influence of wind, current, waves and surf, whereby the landward end of each boom rests upon the beach after the tide ebbs, with the boom floats forming dyke-like obstructions impeding the return flow or undertow current of water thrown on the beach by a breaking surf and returning thence to sea, and thereby collecting on one side of the boom floats deposits of sand particles suspended in the surf which are periodically deposited on the sea bottom as the boom is raised by the returning flood tide, creating sand bar ridges on the sea bottom extending from the beach toward the anchored offshore float terminating each of said plurality of erosion control booms.

*11. The floating boom defined in claim 1, further de-ined by attachment means securing said cable to said fin it a plurality of attachment points arrayed along said boom.*

*12. The floating boom defined in claim 11 wherein at least one of said attachment points is juxtaposed to each of said floats.*

*13. The floating boom defined in claim 11 wherein said attachment means are positioned at a plurality of attach-ment points juxtaposed to each of said floats and serve to maintain said cable juxtaposed to said fin throughout the co-extending lengths of said floats, said cable and and said fin.*

*14. The floating boom defined in claim 12 wherein said non-slack tension-carrying reinforcing cable and said fin are of substantially equal lengths between said attachment points.*

*15. The floating boom defined in claim 11, further de-ined in that said non-slack tension-carrying reinforcing cable is substantially immovably affixed to said fin by said attachment means at each of said attachment points,*

*preventing longitudinal movement of said fin relative to said cable.*

References Cited

The following references, cited by the Examiner, are of record in the patented file of this patent or the original patent.

UNITED STATES PATENTS

| | | | |
|---|---|---|---|
| 877,201 | 1/1908 | Kellner | 61—3 |
| 978,897 | 12/1910 | Kelley | 61—3 |
| 1,646,168 | 10/1927 | Pringle | 61—3 X |
| 1,973,719 | 9/1934 | Lake | 61—69 |
| 2,106,564 | 1/1938 | Fisk et al. | 61—3 |
| 2,240,567 | 5/1941 | Meacham et al. | 61—1 |
| 3,184,923 | 5/1965 | Galvaing | 61—5 X |
| 3,321,923 | 5/1967 | Smith et al. | 61—1 |

FOREIGN PATENTS

| | | |
|---|---|---|
| 1,305,469 | 8/1962 | France. |

PETER M. CAUN, Primary Examiner